(12) United States Patent
Reguzzi

(10) Patent No.: US 7,694,801 B2
(45) Date of Patent: Apr. 13, 2010

(54) DRIVING ASSEMBLY FOR DRIVING PANELS AND PLATE ELEMENTS TO PROCESSING STATIONS

(75) Inventor: Luigi Reguzzi, Mariano Comense (IT)

(73) Assignee: RE. M S.r.l., Perticato di Mariano Comense (IT)

( * ) Notice: Subject to any disclaimer, the term of this patent is extended or adjusted under 35 U.S.C. 154(b) by 174 days.

(21) Appl. No.: 11/042,709

(22) Filed: Jan. 25, 2005

(65) Prior Publication Data

US 2005/0163577 A1   Jul. 28, 2005

(30) Foreign Application Priority Data

Jan. 28, 2004   (IT) .......................... MI2004A0120

(51) Int. Cl.
*B65G 17/00* (2006.01)
*B65G 17/26* (2006.01)

(52) U.S. Cl. ................. 198/470.1; 198/520; 198/474.1; 408/42

(58) Field of Classification Search .............. 198/470.1, 198/479.1, 520
See application file for complete search history.

(56) References Cited

U.S. PATENT DOCUMENTS

| | | | | |
|---|---|---|---|---|
| 2,900,072 A | * | 8/1959 | Tully ........................ | 198/621.1 |
| 3,555,963 A | * | 1/1971 | Evans ......................... | 409/131 |
| 3,559,793 A | * | 2/1971 | Lange ..................... | 198/346.1 |
| 3,581,879 A | * | 6/1971 | White et al. ............. | 198/463.4 |
| 3,776,348 A | * | 12/1973 | Yakubek et al. ........ | 198/377.02 |

* cited by examiner

*Primary Examiner*—Gene Crawford
*Assistant Examiner*—Kavel P Singh
(74) *Attorney, Agent, or Firm*—Hedman & Costigan, PC; James V. Costigan, Esq.

(57) ABSTRACT

A driving assembly for driving panels and plate elements in general to be processed comprises a central framework for supporting a driving chain continuously entrained on a driving pulley and an idle pulley, a plurality of panel driving shoes being coupled to the chain.

The main feature of the invention is that the driving assembly further comprises, on a portion of an active arm of the driving chain, actuator elements for removing the drive shoes from a panel sliding plane, to allow a processing tool to perform a lot of desired machining operations on the panels.

2 Claims, 5 Drawing Sheets

US 7,694,801 B2

DRIVING ASSEMBLY FOR DRIVING PANELS AND PLATE ELEMENTS TO PROCESSING STATIONS

BACKGROUND OF THE INVENTION

The present invention relates to a driving assembly for driving or conveying panels and plate-like elements in general to be processed or machined.

Different types of driving assemblies for conveying panels and plate-like elements in general to be processed, which are usually arranged on a vertically extending plane, are already known.

Said prior driving assemblies conventionally comprise a driving chain supporting driving shoe elements for driving and conveying the plate-like element.

However, prior driving assemblies do not allow to proper machine panels, since the working tools, which can comprise milling tools, perforating bits and the like, would interfere against the driving shoes.

Accordingly, it is necessary to remove the panel from its driving assembly, to perform the desired machining operations, and then relocate said panel on the driving assembly.

Thus, the above processing method requires a very long machining time, with an inevitable increase of the panel processing cost.

SUMMARY OF THE INVENTION

Accordingly, the aim of the present invention is to overcome the above mentioned problem, by providing a panel and plate-like element driving or conveying assembly, for conveying a plurality of panels or plate elements to processing stations, which is specifically adapted to allow contouring, drilling and cutting operations to be performed on said panels, without the need of removing the panels from the driving assembly.

Within the scope of the above mentioned aim, a main object of the present invention is to provide such a panel driving assembly, in which the panels being processed can be firmly clamped on said driving assembly, during the machining operations, thereby greatly simplifying all the panel handling operations.

Another object of the present invention is to provide such a panel driving assembly which is very reliable and safe in operation.

Yet another object of the present invention is to provide such a panel and plate-like element driving assembly which can be easily made starting from easily available elements and materials, and which, moreover, is very competitive from a mere economic standpoint.

According to one aspect of the present invention, the above mentioned aim and objects, as well as yet other objects, which will become more apparent hereinafter, are achieved by a driving assembly for driving panels and plate elements in general to be machined, comprising a central supporting framework supporting a driving chain continuously entrained on a driving pulley and an idle pulley, a plurality of driving shoe being coupled to said driving chain for driving said panels, and being characterized in that said driving assembly further comprises, on a portion of an active branch of said driving chain, actuator means for removing said driving shoes from a sliding plane of said panels, to allow a machining tool to perform on said panels set machining operations.

BRIEF DESCRIPTION OF THE DRAWINGS

Further characteristics and advantages of the present invention will become more apparent hereinafter from the following detailed disclosure of a preferred, though not exclusive, embodiment of a driving assembly for driving or conveying panels and plate elements in general to be machined, which is illustrated, by way of an indicative, but not limitative, example, in the accompanying drawings, where.

DESCRIPTION OF THE PREFERRED EMBODIMENTS

Figure 1:
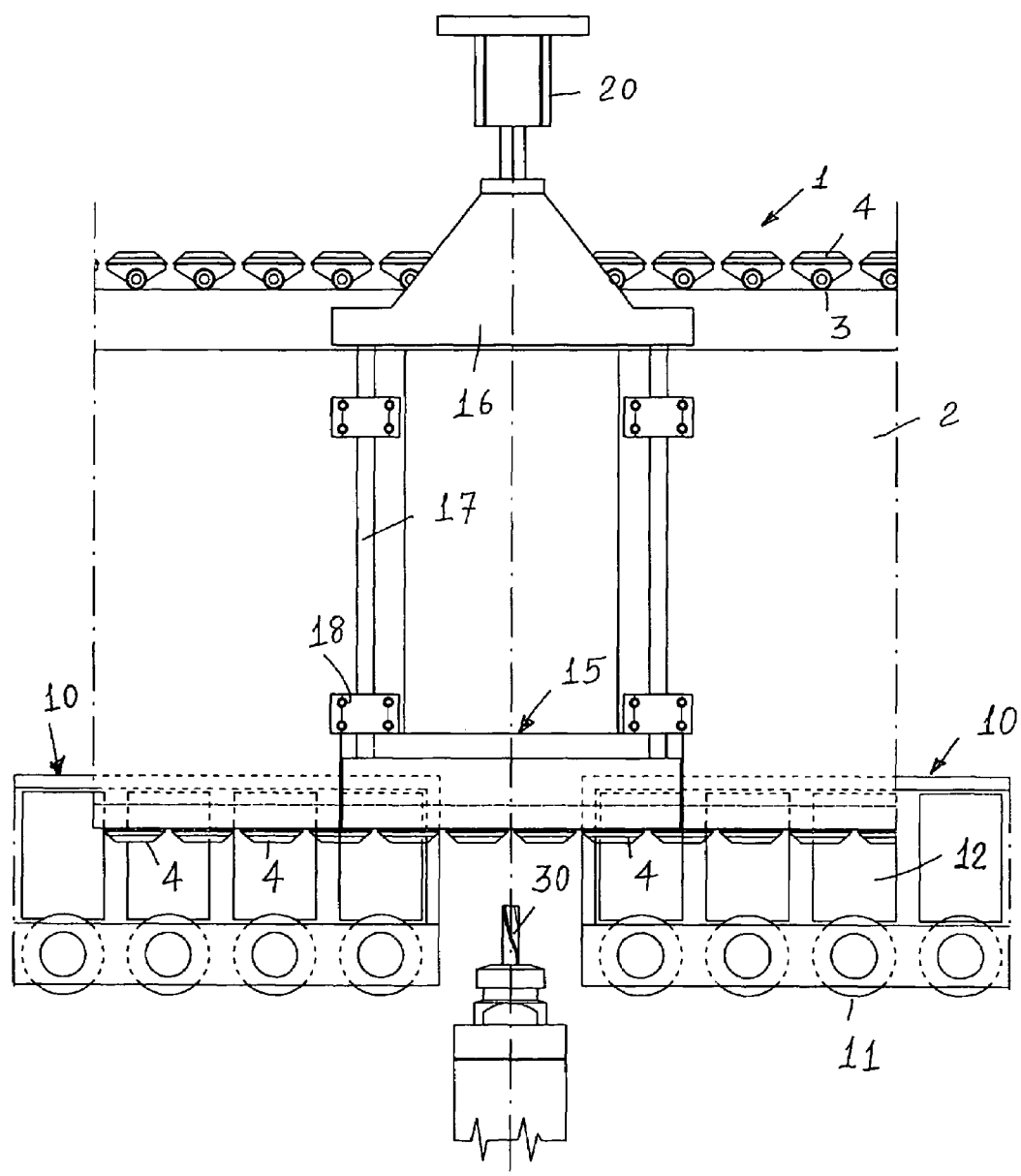
FIG. 1 is a schematic top plan view illustrating the driving assembly according to the present invention, in an inoperative or rest position thereof.
Figure 2:
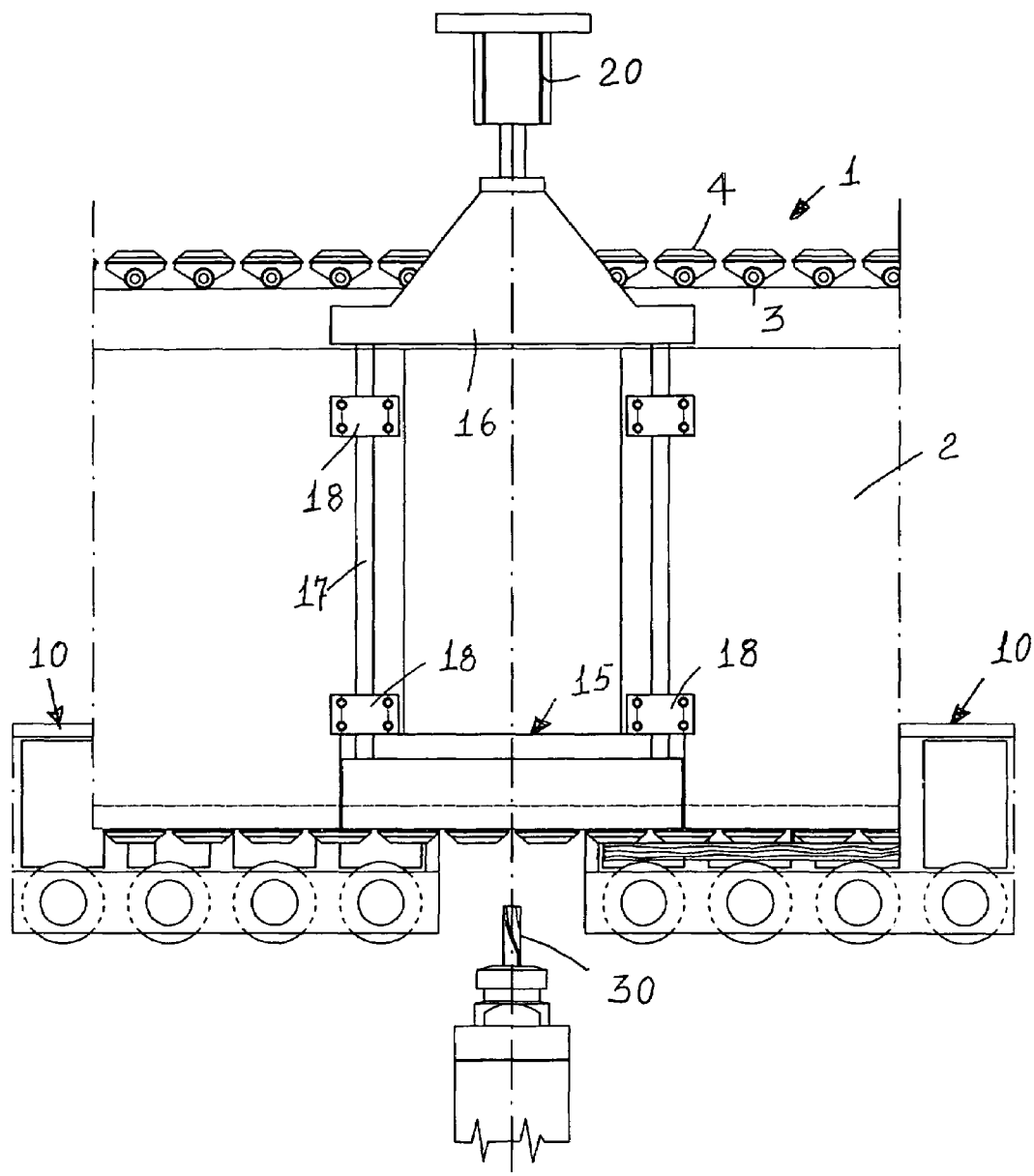
FIG. 2 is a further top plan view illustrating the driving assembly during a panel driving or conveying operation.

With reference to the number references of the above mentioned figures, the driving assembly for driving or conveying panels and plate-like elements in general, according to the present invention, which has been generally indicated by the reference number 1, comprises a central supporting framework 2, which supports a driving chain 3 which is continuously entrained on a driving pulley and an idle pulley, not specifically shown in the drawings.

Figure 3:
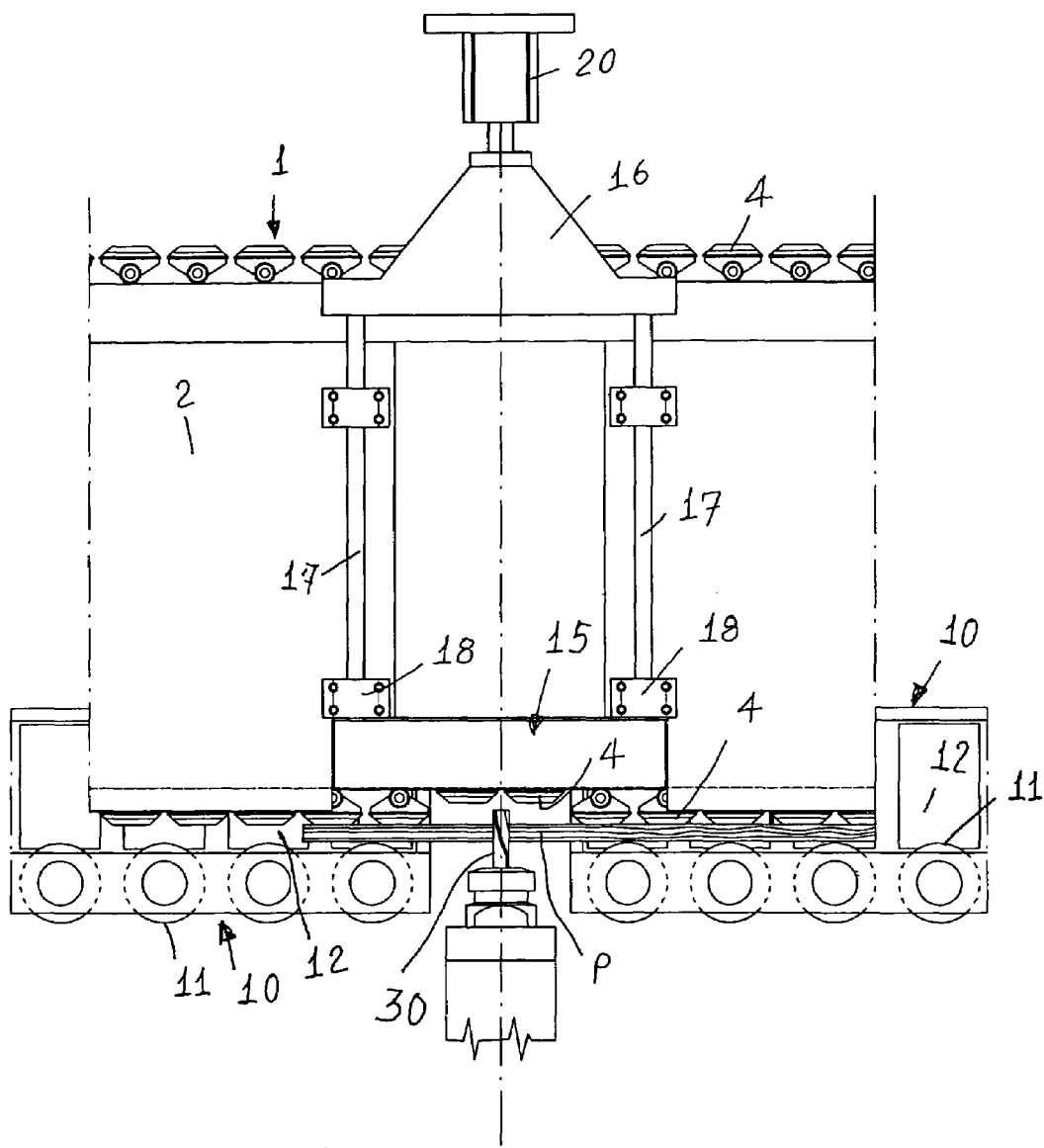
FIG. 3 is a further schematic top plan view illustrating the driving assembly during a panel machining or processing operation.
Figure 4:
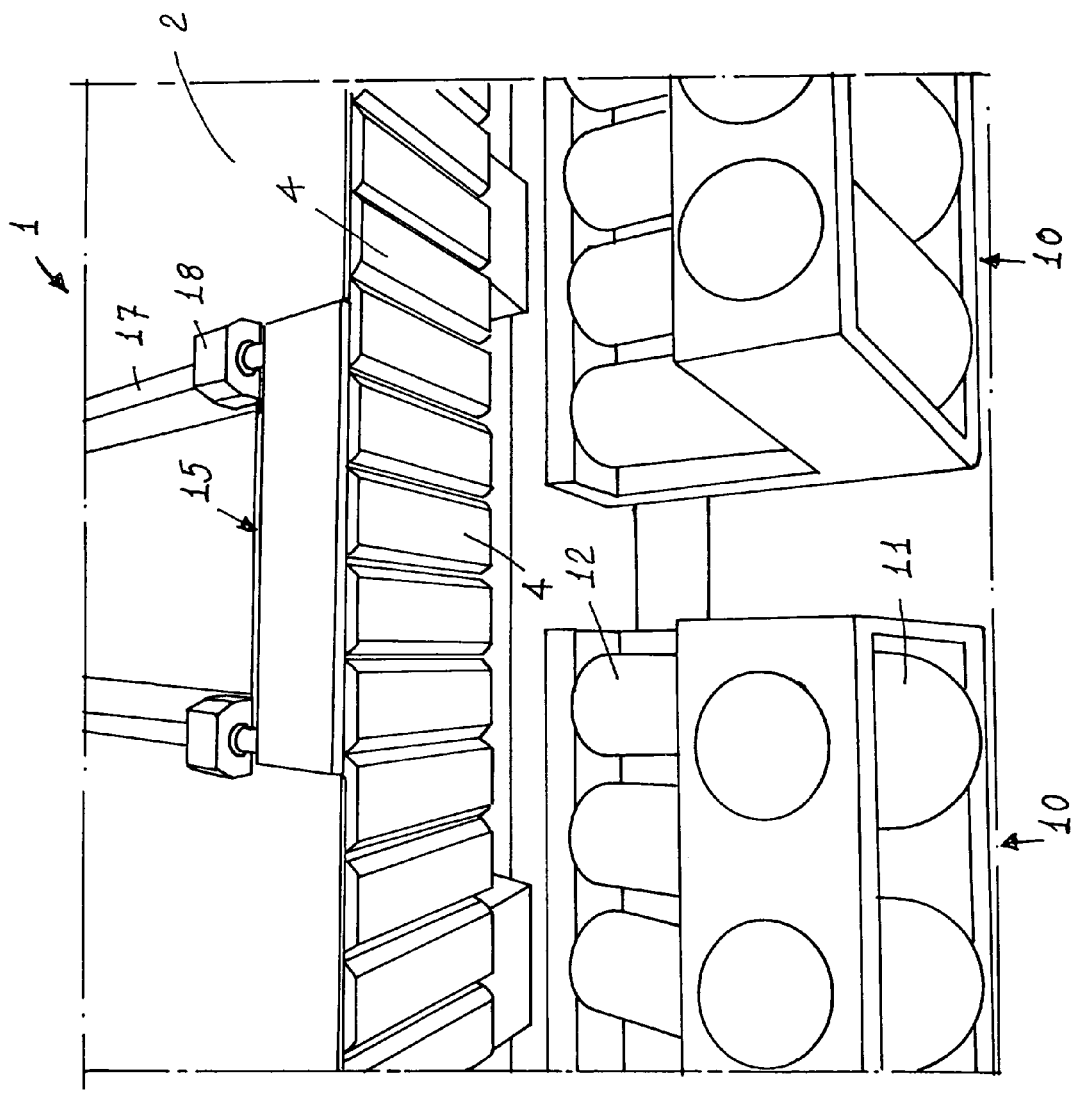
FIG. 4 is a schematic perspective view illustrating a detail of a region thereat actuator means are arranged.

The driving chain 3 comprises a plurality of chain links, to which a plurality of driving shoes 4 are coupled, each said driving shoe having preferably a rubberized flat surface for abutting against and gripping a side flat surface of panel to be processed (See for example FIG. 3).

The driving assembly comprises, in particular, an active branch, on which the panel is conveyed, said active branch including a plurality of clamping elements 10.

Said clamping elements 10 support corresponding vertical axis rubberized roller elements 11, engaging with a face of the panel, and further rubberized rollers 12, of horizontal axis, in turn engaging the edges of the panels being conveyed.

More specifically, the clamping elements 10 are so designed as to press the panel against the shoe elements to cause said panel to be frontward fed, since the shoe elements, driven by the driving chain, can be easily displaced in both directions.

The main feature of the invention is that, at a portion of the active branch of the driving chain, between two clamping means 10, a portion is provided including a plurality of actuator elements, generally indicated by the reference number 15, designed for moving away (obviously in a direction perpendicularly away from the flat surface of the panel) two or more driving shoes 4, i.e. for removing said shoe elements from the sliding plane of the panels, generally indicated by the reference P.

Figure 5:
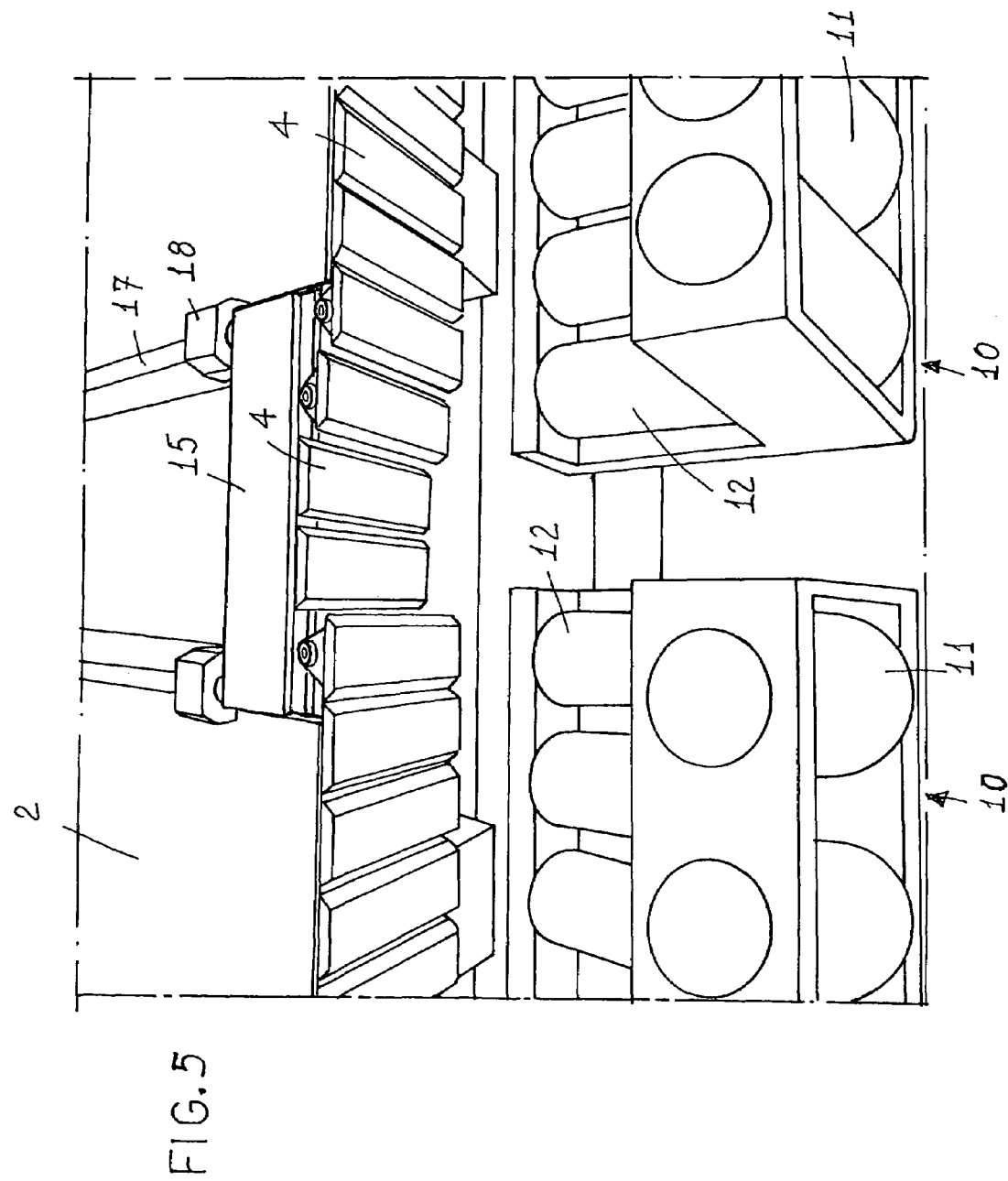
FIG. 5 is a further perspective view illustrating the driving shoe elements in a position thereof removed from the panel sliding plane.

To perform the removing or moving away operation, the actuator means comprises a frame 16 including a plurality of sliding column elements 17, which can slide in sliding guides 18 which are connected to one another at a portion opposite to the active branch and which are coupled to an actuator 20, provided for driving the frame 16 with a consequent displacement of the guides of the driving chain which, as is clearly shown in FIGS. 3 and 5, will remove the driving shoes from the panel sliding plane.

In the region included between the two clamping elements 10 is moreover provided a machining tool, generally indicated by the reference number 30, which, the driving shoes being arranged in a removed position, can perform the required machining operations on the panel, without interfering against the driving shoes which would be arranged, as stated, at a withdrawn position.

The machining tool can be a drilling tool, a cutting tool, a contouring tool specifically designed for contouring the panels or for performing any other desired machining operations thereon.

From the above disclosure it should be apparent that the invention fully achieves the intended aim and objects.

In fact, the invention provides a driving assembly, which allows the panels to be directly machined on the driving assembly itself, since some driving shoes are withdrawn from the panel plane at the machining tool.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes, can be any, depending on requirements.

The invention claimed is:

1. A driving and machining assembly for driving and machining a plurality of continuously successively slidingly fed panels having a flat side, said assembly allowing contouring, drilling and cutting operations to be performed on each said panel without removing said panel from said assembly, said assembly comprising a central supporting framework supporting a continuously bidirectionally longitudinally operated driving chain defining a sliding plane for said panels, said chain having a plurality of chain links to which are coupled a plurality of panel pressure driving shoes, wherein each said driving shoe has a rubberized surface for engaging a said side of a panel, said driving shoes being both longitudinally bidirectionally driven with said chain and further driven, by actuator means, away from said side of said panel, said driving chain comprising an active driving chain branch on which said panels are conveyed and including a plurality of clamping pressing elements to press a said panel against said rubberized surfaces of said shoe elements to cause said panel to be frontward fed, each said clamping pressing element comprising a plurality of vertical axis rubberized rollers engageable against said side of said panel, and a plurality of horizontal axis rubberized rollers engageable against a said edge of said panel, said active driving chain branch further including, between two of said clamping pressing elements, said actuator means for moving at least two of said driving shoes perpendicularly away from said flat side of each said panel, thereby disengaging said at least two driving shoes from said sliding plane of said panel to allow a machining tool included in said driving assembly to perform machining operations on said panel.

2. A driving assembly, according to claim 1, wherein said actuator means comprise a frame including a plurality of sliding column elements sliding in guide blocks which are connected to one another at a portion opposite to said chain active branch, said guide blocks being further coupled to an actuator for driving said frame and moving away said at least two shoes from said sliding plane of said panel to allow said panel to be machined on said driving and machining assembly.

* * * * *